United States Patent
Mixon et al.

(10) Patent No.: US 9,433,149 B2
(45) Date of Patent: Sep. 6, 2016

(54) CHOPPER DRUM MODULE FOR SUGARCANE HARVESTER

(71) Applicant: DEERE & COMPANY, Moline, IL (US)

(72) Inventors: Dusk S. Mixon, Saint Amant, LA (US); Daniel J. Corbett, Thibodaux, LA (US); Guy Burch, Thibodaux, LA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/640,688

(22) Filed: Mar. 6, 2015

(65) Prior Publication Data

US 2015/0327437 A1 Nov. 19, 2015

Related U.S. Application Data (60) Provisional application No. 61/994,010, filed on May 15, 2014.

(51) Int. Cl.
*A01D 34/00* (2006.01)
*A01D 45/10* (2006.01)
*B02C 18/06* (2006.01)

(52) U.S. Cl.
CPC ............... *A01D 45/10* (2013.01); *B02C 18/06* (2013.01)

(58) Field of Classification Search
CPC .. A01D 43/107; A01D 45/10; A01D 43/088; A01D 43/10; A01D 82/02; A01D 43/08; A01F 29/10; A01F 29/095; B02C 18/18; B02C 18/186
USPC ............................ 56/500, 60, DIG. 1, 16.4 R
See application file for complete search history.

(56) References Cited

U.S. PATENT DOCUMENTS

| | | | | |
|---|---|---|---|---|
| 4,897,986 A * | 2/1990 | Baker | ........... | A01D 45/10 384/537 |
| 5,031,392 A * | 7/1991 | Baker | ........... | A01D 45/10 460/123 |
| 5,822,962 A * | 10/1998 | Wagstaff | ........... | A01F 29/09 241/101.762 |
| 6,125,617 A | 10/2000 | Villers et al. | | |
| 6,131,837 A * | 10/2000 | Wanner | ........... | A01D 43/086 241/101.742 |
| 6,539,693 B2 * | 4/2003 | Krone | ........... | A01D 43/107 56/153 |
| 7,874,133 B2 * | 1/2011 | Depestel | ........... | A01D 43/086 56/13.3 |
| 8,276,355 B2 * | 10/2012 | Schafer | ........... | A01D 43/107 56/16.4 R |
| 8,353,149 B2 * | 1/2013 | Engel | ........... | A01D 43/107 56/16.4 A |
| 2013/0111871 A1 * | 5/2013 | Hinds | ........... | B02C 18/18 56/500 |
| 2014/0260169 A1 * | 9/2014 | Pruitt | ........... | A01D 43/10 56/289 |

FOREIGN PATENT DOCUMENTS

DE 19638033 A1 3/1998

* cited by examiner

*Primary Examiner* — Árpád Fábián-Kovács
(74) *Attorney, Agent, or Firm* — Lorenz & Kopf, LLC (57) ABSTRACT

A chopper drum module and sugarcane harvester vehicle include a module frame distinct from a chassis of the sugarcane harvester having first and second drum bores on each side of the module. The first and second drum bores support, respectively, first and second chopper drums for parallel rotation. A plurality of mounting devices may be attached to the module frame or the chassis, wherein when the mounting devices are in an engaged state the module frame is secured to the chassis by the mounting devices such that the chopper drums receive sugarcane from a feed mechanism supported by the chassis. When the mounting devices are in a disengaged state, the module frame and the chopper drums may be collectively removable from the chassis and the sugarcane harvester.

20 Claims, 11 Drawing Sheets

CHOPPER DRUM MODULE FOR SUGARCANE HARVESTER

CROSS-REFERENCE TO RELATED APPLICATION(S)

This application claims priority under 35 U.S.C. §119 to U.S. Provisional Application No. 61/994,010, filed May 15, 2014, the disclosure of which is incorporated herein by reference.

STATEMENT OF FEDERALLY SPONSORED RESEARCH OR DEVELOPMENT

Not applicable.

FIELD OF THE DISCLOSURE

This disclosure relates generally to sugarcane harvesting, including the chopping of sugarcane into billets.

BACKGROUND OF THE DISCLOSURE

In order to harvest sugarcane from a field, a sugarcane harvester may cut sugarcane plants into stalks. The stalks may then be moved by various rollers or other mechanisms to chopper drums, which may cut the stalks into billets of relatively uniform size. The operation of such chopper drums may impart significant vibrations and other disturbances to the sugarcane harvester in general, including to an operator cab of the harvester.

In various instances, and for various different reasons, different chopper drums (or chopper drum configurations) may be utilized for the same harvester. For example, one set of chopper drums (or chopper drum configuration) may be utilized when sugarcane is being harvested for processing into sugar or other products, whereas a different set of chopper drums (or chopper drum configuration) may be utilized to cut sugarcane into billets for re-planting. This may require removal of one set of chopper drums so that a different set (or the same set configured differently) may be installed. It may also be necessary to remove or replace various chopper drums (and related mechanisms) at different times for cleaning and maintenance purposes.

SUMMARY OF THE DISCLOSURE

A chopper drum module for a sugarcane harvester with a chassis and a feed mechanism is disclosed. According to one aspect of the disclosure, the module may include a module frame distinct from the chassis. The module frame may include first and second drum bores on each side of the module, the first drum bores and second drum bores supporting, respectively, first and second chopper drums for parallel rotation. A plurality of mounting devices may be attached to the module frame or the chassis, wherein when the mounting devices are in an engaged state the module frame is secured to the chassis by the mounting devices such that the chopper drums receive sugarcane from the feed mechanism. When the mounting devices are in a disengaged state, the module frame and the chopper drums may be collectively removable from the chassis and the sugarcane harvester.

In certain embodiments, one or more of mounting devices may include a vibration dampening device, to reduce transmission of vibration between the chassis and the module frame when the module frame is secured to the chassis. The vibration dampening device may include rubber members interposed between the chassis and the module frame. A compression member may urge the rubber members against an attachment member on the module frame or the chassis to secure the module frame to the chassis.

In certain embodiments, a gear box for powering the chopper drums may be mounted to the module frame such that, when the mounting devices are in the disengaged state, the gear box may be collectively removable from the chassis and the harvester with the module frame and the chopper drums.

In certain embodiments, each drum bore may be surrounded, at least in part, on an exterior portion of the module frame, by a face plate. The face plates may provide an alignment surface to align rotation of the chopper drums.

In certain embodiments, a bearing mount for each chopper drum may include a mounting plate attached to the module frame and a neck supporting a bearing for rotation of the chopper drum. The mounting plate may be attached to the exterior of the module frame and the neck may extend through associated drum bore into the interior of the frame. The neck may support the bearing for the chopper drum within the interior of the chopper drum. The mounting plate may be seated on the face plate.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed chopper drum module, as shown in the accompanying figures of the drawings described briefly above. Various modifications to the example embodiments may be contemplated by one of skill in the art.

Traditional sugarcane harvester designs may introduce various issues with regard to chopper drums. As noted above, in order to harvest sugarcane from a field, a sugarcane harvester may cut sugarcane plants from the ground, then direct the cut stalks via various feed rollers (or another feed mechanism) to a set of chopper drums. As driven, for example, by one or more hydraulic motors, the chopper drums may counter-rotate such that blades attached to the chopper drums pass in close proximity and cut the sugarcane stalks into billets of relatively uniform size. In certain historical configurations of sugarcanes harvesters, these chopper drums and the feed rollers may be collectively supported on a single chassis of the harvester. Among other issues, this may result in the transmission of significant vibration throughout the harvester, including to a cab of the harvester, during operation of the chopper drums. Further, due to the extreme nature of sugarcane harvesting operations, it may be necessary to change chopper drums (and chopper drum configurations) with relative frequency. With historical configurations of sugarcane harvesters, this may tend to require a significant investment of time and activity.

The disclosed chopper drum module (and related sugarcane harvester) may address these and other issues. In certain embodiments, a module frame may be provided to rotatably support the chopper drums of a harvester. The module frame may be constructed as a distinct component from the harvester chassis, such that the module frame, along with the chopper drums, may be collectively removed from the intact harvester chassis. This may allow for removal of the chopper drums from the harvester without extensive disassembly of associated gear boxes, bearing assemblies and so on, as may be required for traditional harvester designs. Further, this may allow for operators to maintain multiple chopper drum modules, each with different chopper drum configurations, and easily swap between the various modules as needed (e.g., for harvesting seed cane, and so on).

In certain embodiments, various vibration dampening devices (or vibration isolators) may be attached to the module frame and utilized to secure the module frame (and, correspondingly, the chopper drums) to the harvester chassis. For example, various rubber vibration isolators may be utilized as part of the mounting devices used to secure the module frame to the chassis, such that the transmission of vibrations between the chopper drum module and the chassis (and the harvester in general) is reduced. This may significantly improve operator experience during operation of the harvester. Further, this reduction in transmission of vibrations may reduce the wear on, and chances of the misalignment of, the chopper drums and various other components of the harvester.

Chopper drum modules with these (and other) characteristics may provide various advantages in addition (or as an alternative) to increasing the ease of removing and replacing chopper drums and reducing the transmission of vibrations to and from the chopper drums. For example, in certain traditional designs a chassis supporting the feed rollers and the chopper drums may be constructed through various welding operations. Such welding may tend to distort portions of the chassis, which may lead to misalignment of the rotational axes of the various chopper drums when the drums are mounted to the chassis. This may result in sub-optimal (e.g., non-uniform) cutting of sugarcane billets, as well as various other issues, including excessive wear on and premature failure of chopper drums and associated components (e.g., supporting bearings). In contrast, a removable chopper drum module, as discussed in greater detail below, may be configured to reduce the incidence of such distortion and misalignment, and thereby contribute to higher quality cutting of billets and generally improved operation the chopper drums and other components.

As will become apparent from the discussion herein, the disclosed chopper drum module may be used advantageously in a variety of settings and with a variety of machinery. In certain embodiments, referring now to FIG. 1, the disclosed module may be included in a sugarcane harvester 20. It will be understood, however, that the disclosed chopper drum module may be used for various other vehicles or non-vehicle platforms, including various sugarcane harvesters of different configurations or designs than the sugarcane harvester 20 of FIG. 1.

Figure 1:
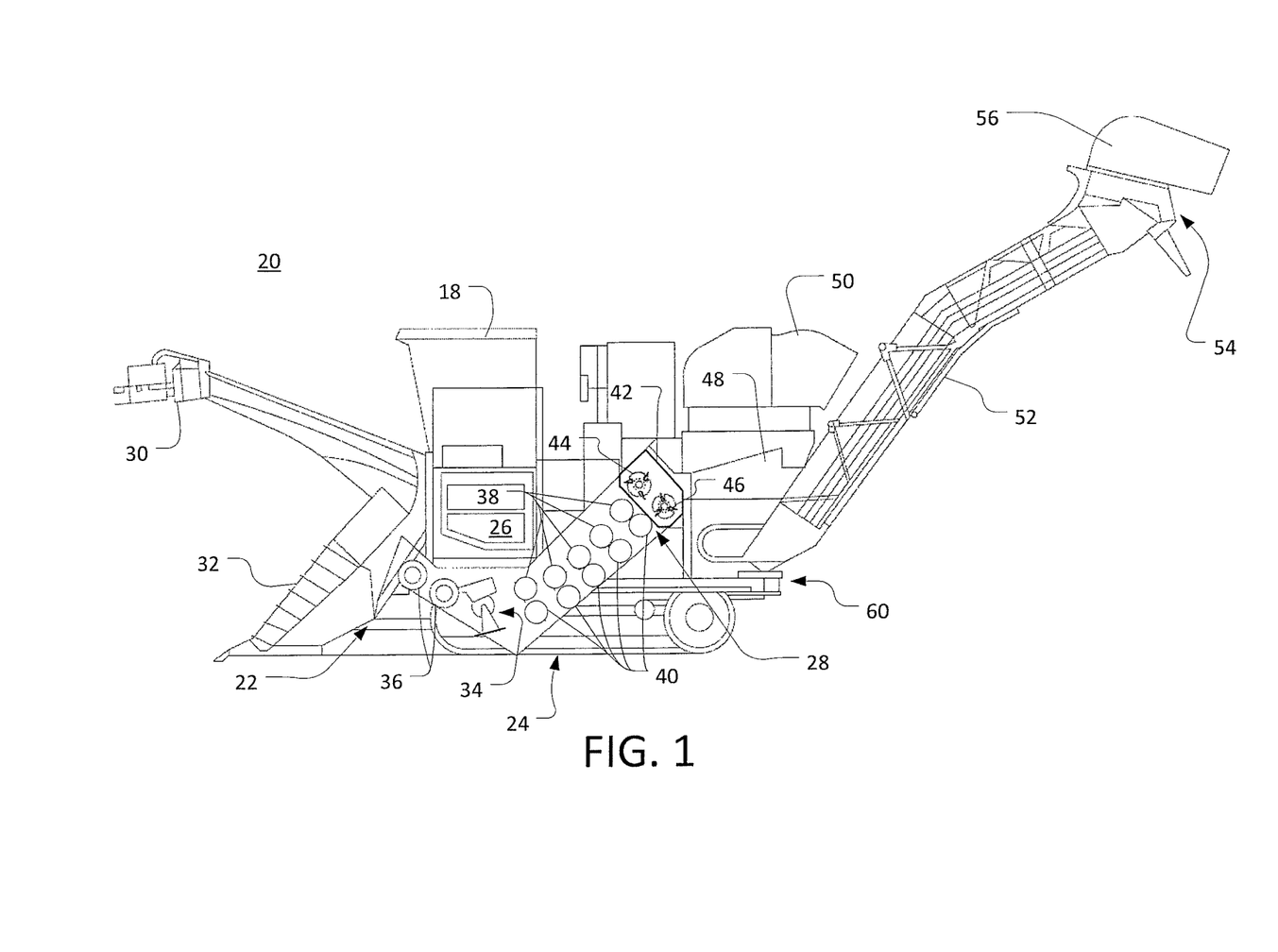
FIG. 1 is a side view of an example sugarcane harvester with a chopper drum module.

The harvester 20 is presented in a side view in FIG. 1, with the front of the harvester 20 facing to the left. Accordingly, certain right-side components of the harvester 20 may not be visible in FIG. 1. The harvester 20 may include a main frame 22 supported on track assemblies 24 or wheels (not shown), with a cab 18 to house an operator. An engine 26 may supply power for driving the harvester along a field and for powering various driven components of the harvester 20. In certain embodiments, the engine 26 may directly power a hydraulic pump (not shown) and various driven components of the harvester 20 may be powered by hydraulic motors (not shown) receiving hydraulic power from the hydraulic pump via an embedded hydraulic system (not shown).

A cane topper 30 may extend forward of the frame 22 in order to remove the leafy tops of sugarcane plants (not shown), and a set of crop dividers 32 (only the left-side divider 32 shown in FIG. 1) may then guide the remainder of the sugarcane toward internal mechanisms of the harvester 20 for processing. As the harvester 20 moves across a field, plants passing between the crop dividers 32 may be deflected downward by one or more knockdown rollers 36 before being cut near the base of the plants by a base cutter assembly 34 mounted on the main frame 22. Rotating disks, guides, or paddles (not shown) on the base cutter assembly 34 may further direct the cut ends of the plants upwardly and rearward within the harvester 20 toward successive pairs of upper and lower feed rollers 38 and 40. The feed rollers 38 and 40 may be rotatably supported by a chassis 28, and may be rotatably driven by a hydraulic motor or other device (not shown) in order to convey the stalks toward a chopper drum module 42 for chopping into relatively uniform billets.

As described in greater detail below, the chopper drum module 42 may include upper and lower chopper drums 44 and 46, respectively, which may rotate in opposite directions around, respectively, parallel axes 62 and 64 (see FIG. 7) in order to chop the passing stalks into billets and propel the billets into a cleaning chamber 48 at the base of a primary extractor 50. The primary extractor 50 may utilize a powered fan to extract trash and debris from the cleaning chamber 48. A loading elevator 52, with a forward end located at the bottom of the cleaning zone 48, may then convey the cleaned billets upward to a discharge location 54, below a secondary extractor 56, where the billets may be discharged into a trailing truck or other receptacle (not shown).

Figure 2A:
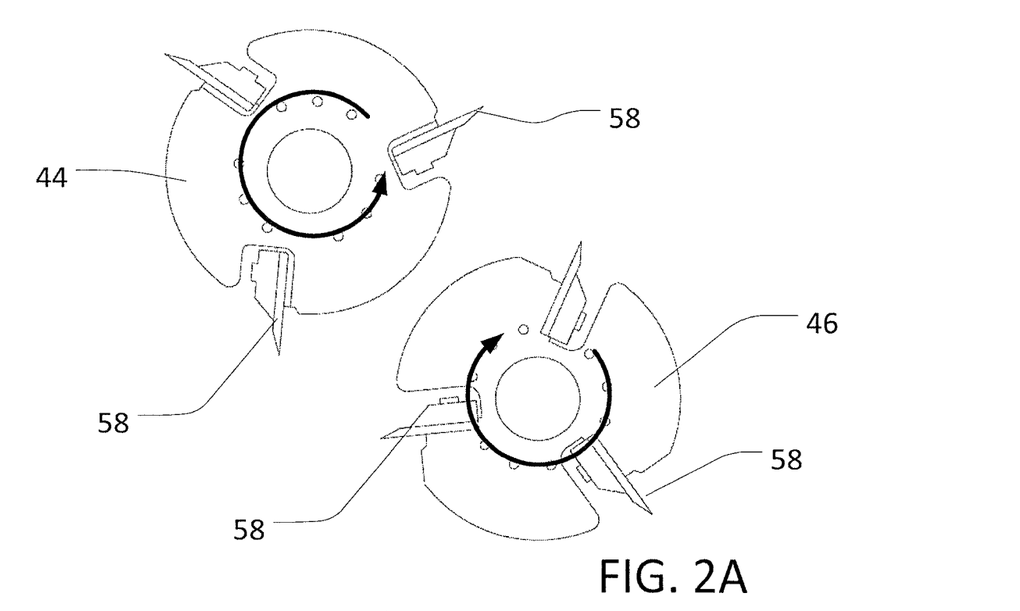
FIGS. 2A and 2B are side views of aspects of the operation of two chopper drums included in the chopper drum module of FIG. 1.
Figure 2B:
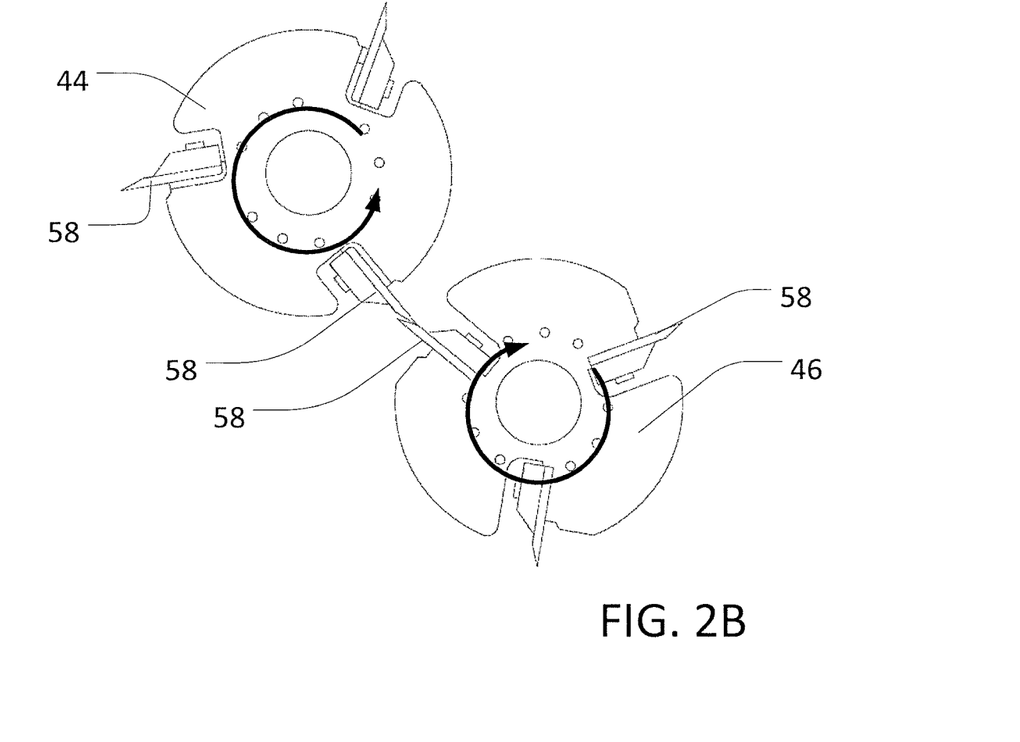

Referring also to FIGS. 2A and 2B, the chopper drums 44 and 46 may each include a number of blades 58, which may be attached to the body of the drums 44 and 46 in various known ways. Referring in particular to FIG. 2B, as the chopper drums 44 and 46 counter-rotate (i.e., rotate in opposite directions), the tips of successive blades 58 may pass within relatively close proximity to each other in order to cut the sugarcane into billets for further processing. The chopper drums 44 and 46 are depicted in FIGS. 2A and 2B as having three blades 58 each. It will be understood that other configurations may be possible. For example, certain chopper drums may include four or more blades, while others (e.g., seed cane chopper drums) may include only two blades.

For various reasons, it may be important to ensure that the pieces of cane cut by the blades 58 exhibit relatively uniform size. For example, the fan-based separation within the primary extractor 50 may depend on a relatively uniform size of leaf pieces and stalk billets in order to exploit the density differences between the leaves and stalks to remove the leaves from the harvester. This uniformity, in turn, may depend on a relatively precise alignment of the chopper drums 44 and 46. For example, if the rotational axes of the chopper drums 44 and 46 deviate from parallel, the blades 58 of the drums 44 and 46 may pass within closer proximity to each other at one point along the length of the chopper drums 44 and 46 than at another. This may result in more complete cutting of the sugarcane material, including the sugarcane leaves, at the former point along the drums 44 and 46 than at the latter. With such non-uniform cutting, the extractor 50 may not separate leaves from stalk as effectively as may be desired. Accordingly, it may be useful to ensure that the two drums 44 and 46 rotate around the relatively parallel axes 62 and 64.

As noted above, the design of certain traditional sugarcane harvesters may create issues with regard to this aspect, and others, of chopper drum operation. For example, where the chopper drums of a harvester are mounted to a unitary welded chassis (e.g., which may also support various feed rollers, and other harvester components such as a loading elevator), the welding operations necessary for the construction of the chassis may tend to warp or otherwise distort portions of the chassis. This may lead to difficulties in maintaining appropriate rotational alignment of the chopper drums.

Further, with a unitary chassis, forces from other portions of the harvester may be transferred directly to the chopper drums (or supporting components, such as bearings, drum bores, and so on), resulting in further misalignment of the chopper drums. For example, referring again to FIG. 1, the loading elevator 52 may weigh 5,000 pounds or more, and may rotate from side to side on the harvester 20 as supported by a slew table 60. This weight, including during the side-to-side movement of the elevator 52, may bear on the chassis 28 via the connection between the slew table 60 and the chassis 28, and thereby impose distorting forces on the chassis 28. With an integral chassis design of certain historical harvesters, these forces may tend to misalign the chopper drums.

Figure 3:
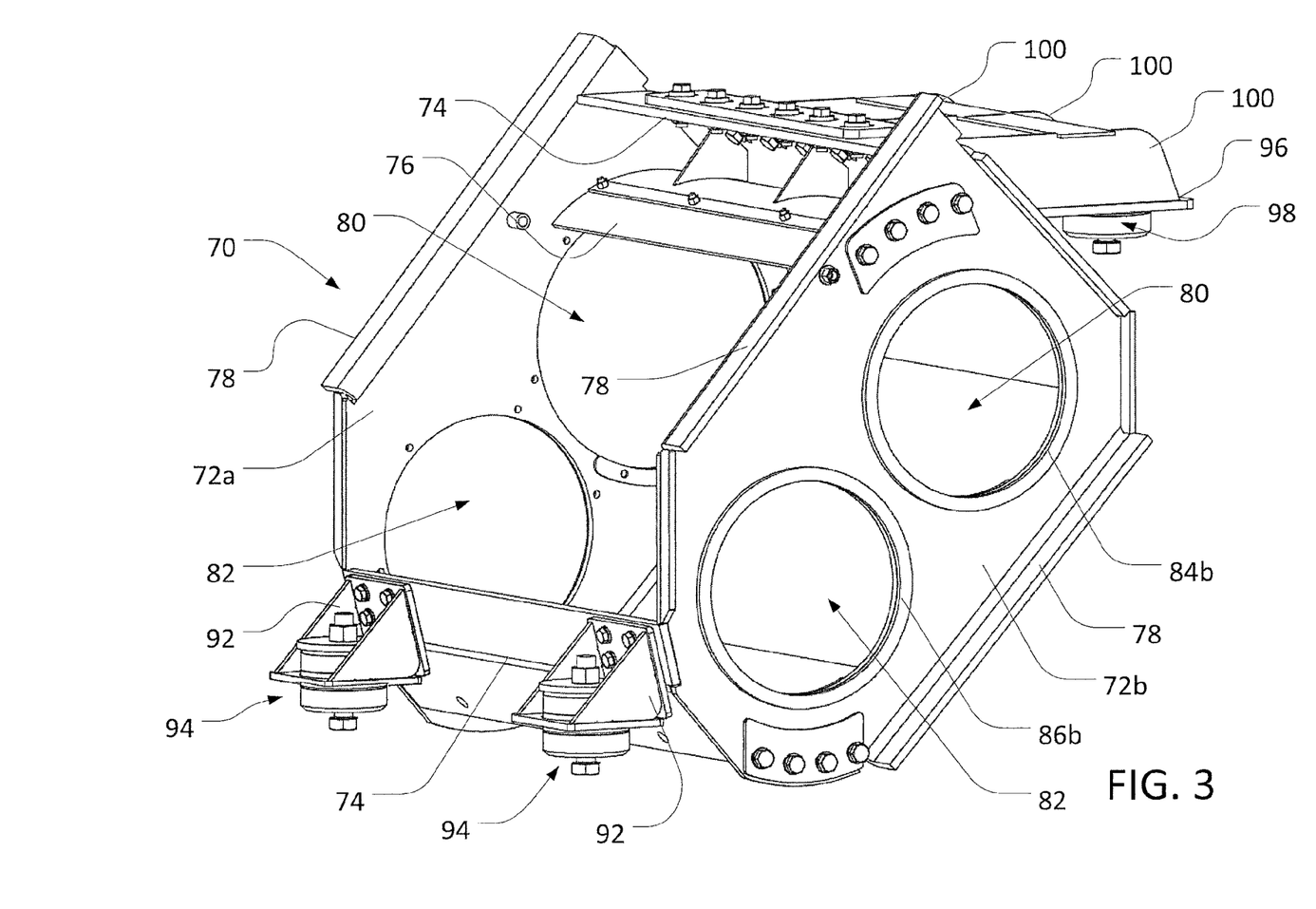
FIG. 3 is a perspective view of a frame of the chopper drum module of FIG. 1, including vibration-dampening mounting devices.

Accordingly, referring also to FIG. 3, it may be useful to provide a module frame 70 for the chopper drum module 42 that is both distinct from the chassis 28 and relatively easily removable from the chassis 28. In the embodiment depicted, for example, the module frame 70 may generally include side members 72a and 72b (collectively referred to herein as side members 72), linked by various cross members 74. In certain embodiments, the side members 72 and cross members 74 may be formed from metal sheets appropriately shaped and joined. As depicted, for example, side members 72 include metal side sheets that are connected by sheet-metal cross members 74. It will be understood, however, that various other configurations may be possible. In certain embodiments, various of members 72 and 74 may include features to provide additional structural strength to the module frame 70. For example, the side members 72 may include various bends 78 along the opposite long edges of the side members 72. Side members 72 may be generally shaped in order to slide into and out of an appropriate space on the chassis 28, as described in greater detail below (see, e.g., FIGS. 9 and 10.

Each side member 72 may include an upper drum bore 80 to support the rotation of upper chopper drum 44, and a lower drum bore 82 to support the rotation of the lower chopper drum 46. In certain embodiments, various deflectors (e.g., deflector 76, or deflector 102 (see FIG. 4)) may be provided with respect to the drum bores 80 and 82, in order to appropriately direct billets cut by the chopper drums 44 and 46 into the cleaning chamber 48 (see FIG. 1).

Figure 6:
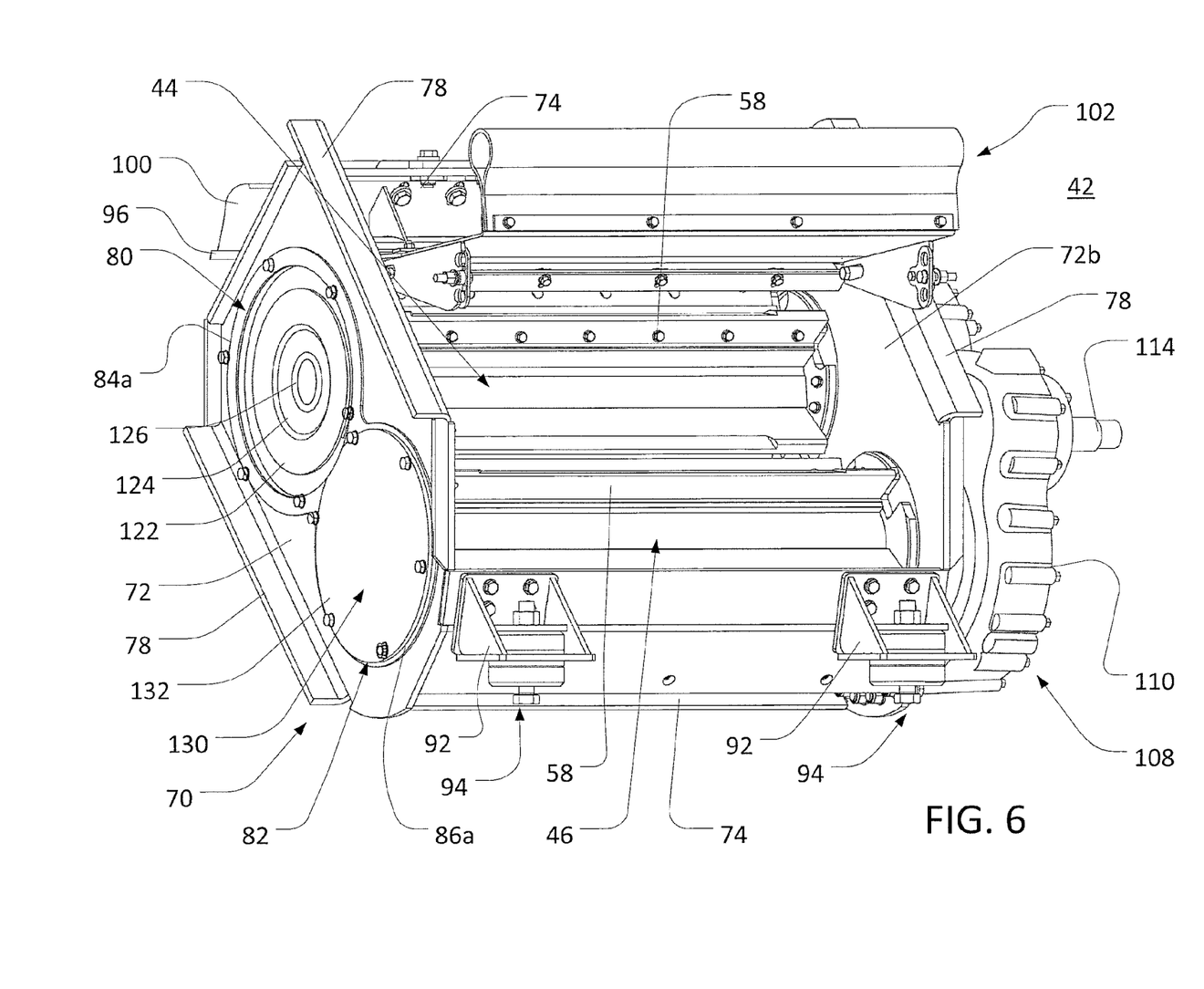
FIG. 6 is another perspective view of the chopper drum module of FIG. 4, with one bearing mount shown and one bearing mount removed.
Figure 7:
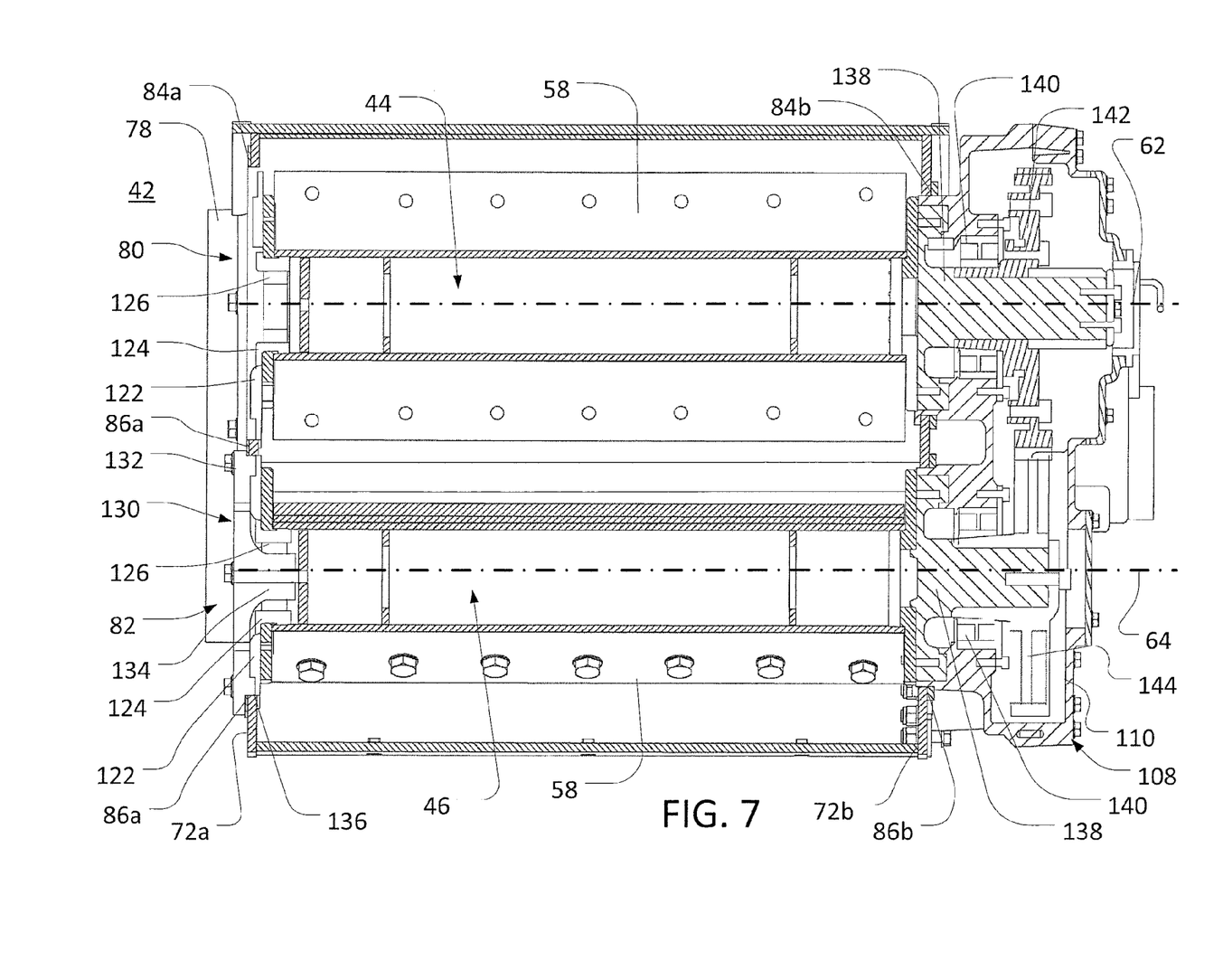
FIG. 7 is a sectional view of the chopper drum module of FIG. 4 taken through the centerline of the chopper drums mounted in the module, with one bearing mount shown and one bearing mount removed.

In certain embodiments, metal "stand-off" or face plates 84a, 84b, 86a, and 86b (referred to herein, collectively, as face plates 84 and 86) may generally surround the drum bores 80 and 82, respectively, on the exterior side of the side members 72 (see FIGS. 6 and 7 for face plates 84a and 86a). As discussed in greater detail below, these plates 84 and 86 may be appropriately surfaced or machined in order to provide an appropriately planar surface to support various mounting mechanisms for the chopper drums 44 and 46. In this way, the plates 84 and 86 may ensure appropriately parallel rotation of the drums 44 and 46 even if the frame 70 is distorted in the creation of the bores 80 and 82 or otherwise.

In order to secure the module frame 70 (and, thereby, the entire chopper drum module 42) to the chassis 28, a number of mounting devices may be attached to the module frame 70 (or another component of the module 42). As depicted, for example, two lower mounting brackets 92 and an extended upper mounting bracket 96 (see also FIG. 5), with reinforcing ribs 100, may be bolted to the cross members 74 of the module frame 70. (It will be understood that various other numbers and configurations of mounting devices may be utilized.) These brackets 92 and 96 may then be bolted, or otherwise secured, to corresponding mounting locations on the chassis 28, in order to removably secure the module frame 70 to the chassis 28. (It will be understood that the module frame 70 may additionally (or alternatively) be secured to various other features of the harvester 20.) In certain embodiments, the brackets 92 and 96 may be attached to the module frame 70 when the chopper drum module 42 is inserted into (or removed from) the harvester 20. In certain embodiments, the brackets 92 and 96 may be attached to the module frame 70 after the chopper drum module 42 is inserted into the harvester 20 (or detached from the module frame 70 before the module 42 is removed from the harvester 20).

In certain embodiments, the various mounting devices (e.g., including the mounting brackets 92 and 96) may include various vibration dampening devices, such as vibration isolators 94 and 98. As discussed in greater detail below, the isolators 94 and 98 may include various rubber (or similar) members interposed between the module frame 70 and the chassis 28 in order to inhibit the transmission of vibrations between the frame 70 and the chassis 28. The module 42 is depicted with four total isolators 94 and 98. It will be understood, however, that any number of isolators may be utilized.

Figure 4:
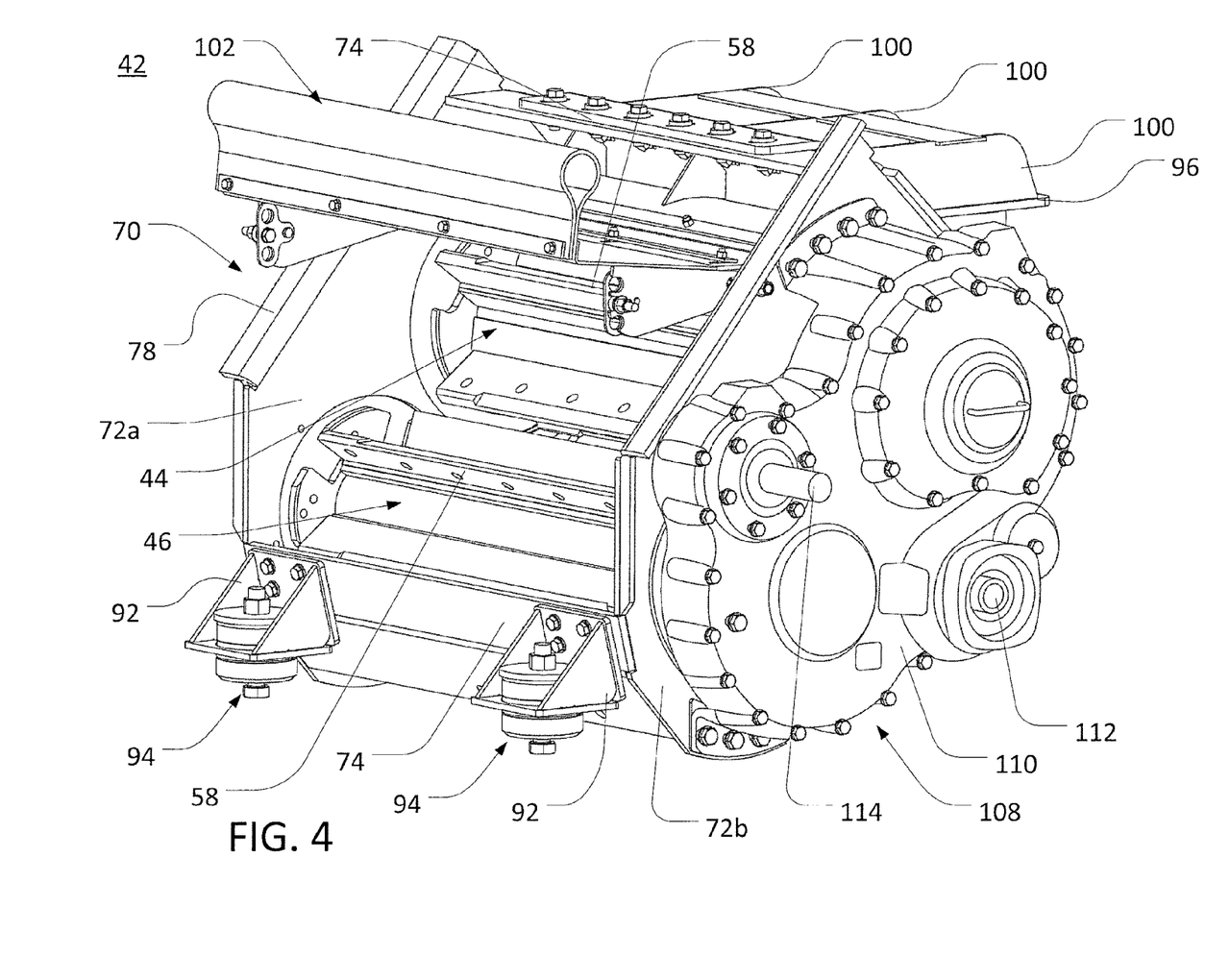
FIG. 4 is a perspective view of the chopper drum module of FIG. 1.
Figure 5:
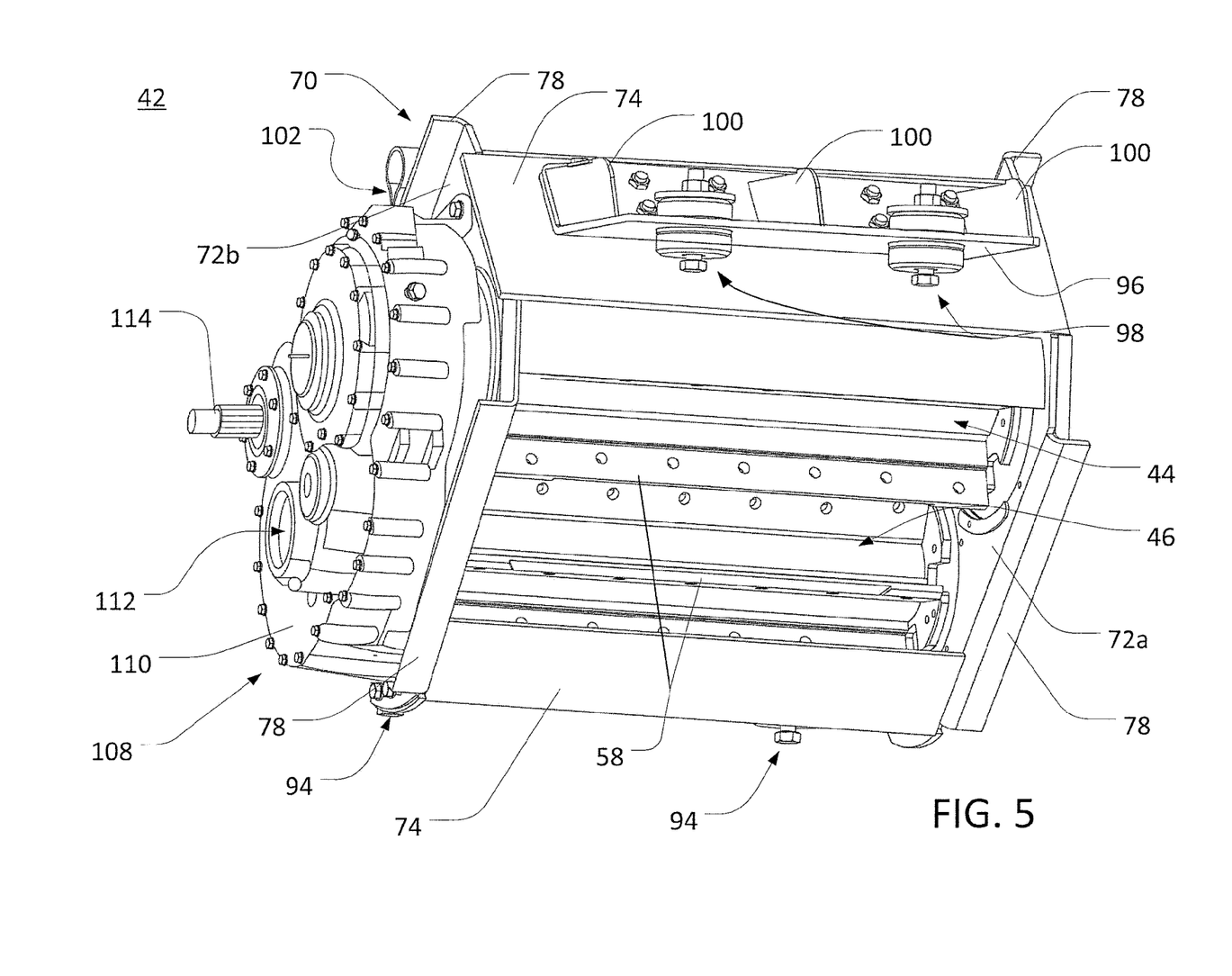
FIG. 5 is a rear perspective view of the chopper drum module of FIG. 4.

Referring also to FIGS. 4 and 5, in certain embodiments, the module frame 70 and the chassis 28 may be configured such that the chopper drums 44 and 46, as well as various other components, may be installed on the module frame 70 before the frame 70 is inserted into the harvester 20 and secured to the chassis 28. In this way, for example, when maintenance or replacement is necessary for a chopper drum assembly, an operator may disengage the various mounting devices (e.g., may unbolt connections between the chassis 28 and the mounting brackets 92 and 96) and then remove the entire chopper drum module 42, including the module frame 70 with the chopper drums 44 and 46 still mounted thereto, from the chassis 28. Further, in certain operations, the operator may have a pre-configured alternate chopper drum module (not shown) already prepared for installation on the harvester 20, such that the operator may simply swap the installed chopper drum module 42 with the pre-configured alternate, then continue harvester operations without further delay. For example, an operator may configure a first chopper drum module with chopper drums suitable for normal processing of sugarcane, and may configure a second chopper drum module with chopper drums configured for cutting seed cane. In this way, because of the modular nature of the disclosed chopper drum module, an operator may switch between normal harvesting and seed cane harvesting, simply by detaching and removing the entire first module, then inserting and securing the second module. In contrast, with more traditional designs, an operator may be required to disassemble and detach an associated gear box, disassemble and remove various bearing mounts, then remove the chopper drums individually.

In certain embodiments, a gear box 108 may be attached to the module frame 70 in order to drive the rotation of the chopper drums 44 and 46. As depicted in FIGS. 4 and 5, for example, the gear box 108 may be bolted, or otherwise attached, to the side member 72b of the module frame 70. The gear box 108, as depicted, may include a cover 110, an input shaft 112 configured to receive rotational power from a hydraulic motor (not shown), and a stub shaft 114 configured to provide rotational power to an associated flywheel (not shown). Various internal gears (see FIG. 7) may route the rotational power from the input shaft 112, with appropriate relative timing, to each of the chopper drums 44 and 46 and the flywheel.

In certain embodiments, the gear box 108 may be configured to also be removed from the chassis collectively with the module frame 70 and the chopper drums 44 and 46. For example, in the embodiment depicted in FIGS. 4 and 5, the outer contours of the cover 108 may not extend beyond the outer edges of the side member 72b. Accordingly, when the module frame 70 is detached from the chassis 28 and the gear box 108 remains bolted to the module frame 70, the gear box 108 and the frame 70 may be together removed from the harvester 20 through the same space(s) or opening(s) in the chassis 28 (or other components of the harvester 20). This may further facilitate a relatively easy transition between various harvesting modes or other swapping or maintenance of chopper drums. For example, an operator may maintain a first chopper drum module with a first gear box and, potentially, a first hydraulic motor, for normal harvesting, and a second chopper drum module with a second gear box and, potentially, a second hydraulic motor, for seed cane harvesting. Accordingly, in order to switch between normal and seed cane harvesting, an operator may detach the frame of the first module from the chassis 28, detach the first module from the hydraulic system of the harvester 20, and remove the entire first module from the harvester 20. Then, the operator may insert the entire second module, attach the second module to the hydraulic system of the harvester 20, and attach the frame of the second module to the chassis 28.

The chopper drums 44 and 46 may be mounted to the module frame 70 for rotation in a variety of ways. In certain embodiments, referring also to FIGS. 6-9, various bearing mounts 130 may be provided, which may be attached to the side member 72a opposite the gear box 108. For clarity of presentation of various other components, only a lower bearing mount 130 for lower drum bore 82 (and lower chopper drum 46) is depicted in the various figures. It will be understood, however, that a similar upper bearing mount (not shown) may be provided for upper drum bore 80 (and upper chopper drum 44).

In certain embodiments, each bearing mount 130 may include a disk-like mounting plate 132, which may be bolted (or otherwise attached) to the side member 72a, and seated on the associated face plate 84a or 86a. As noted above, the outer surfaces of the face plates 84a and 86a may be finished (e.g., by machining, polishing, and so on), before or after the creation of the drum bores 80 and 82, in order to provide a relatively flat surface extending in a normal direction with respect to the desired axes of rotation 62 and 64 of the chopper drums 44 and 46. In this way, even if some amount of distortion or warping of the module frame 70 occurs during manufacturing (e.g., during boring of the drum bores 80, or connection of the cross members 74 to the side members 72), because the mounting plates 132 of the bearing mounts 130 may be seated on the face plates 84a and 86a, rather than directly on the side member 72a, any such distortion may be negated with respect to the rotation of chopper drums 44 and 46.

Figure 8:
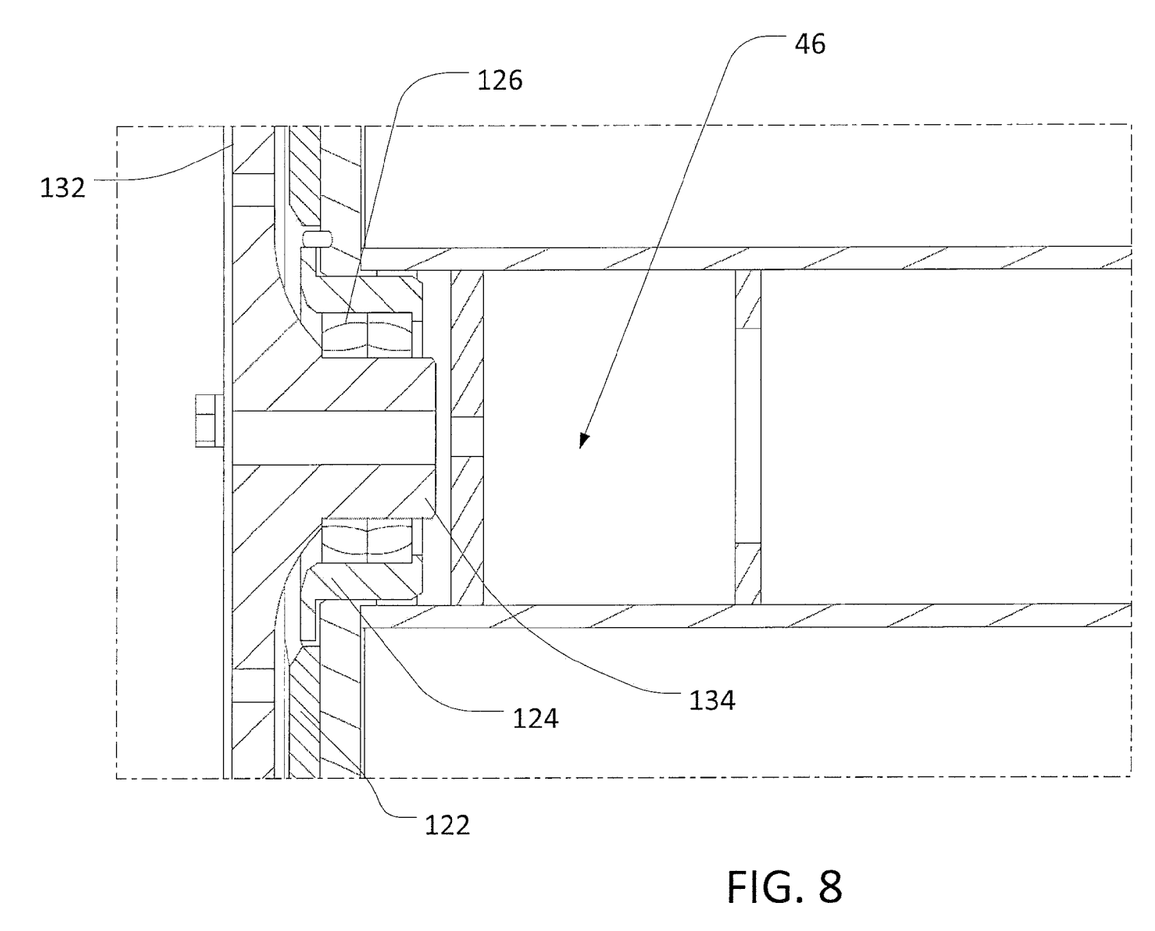
FIG. 8 is an enlarged sectional view of a bearing assembly of the chopper drum module of FIG. 4, taken from a similar perspective as FIG. 7.

By way of the mounting of the mounting plates 132 to the module frame 70, each bearing mount 130 may rotatably support the associated chopper drums 44 and 46 for rotation with respect to the module frame 70 (and the chassis 28). Referring in particular to FIGS. 7 and 8, for example, a neck 134 of each bearing mount 130 may extend away from the mounting plate 132 and inward through the associated drum bore 80 or 82. The inner race of a bearing 126 for each chopper drum 44 and 46 may be seated on the neck 134 of the associated bearing mount 130. In certain embodiments, ring members 124 may provide a supportive connection between the outer races of the bearings 126 and the body of the chopper drums 44 and 46. (It will be understood that various other connection configurations between the bearings 126 and the chopper drums 44 and 46 may be possible.) A ring member 124 and a bearing 126 may be mounted to the neck 134 of each bearing mount 130 at a location that provides appropriate clearance between end plates 122 of the chopper drums 44 and 46, and both the interior of the mounting plates 132 and the interior of the side member 72a of the module frame 70.

Among other advantages, the necked configuration of the bearing mount 130 depicted in FIGS. 7 and 8 (and similar configurations) may further assist in maintaining the desired parallel rotation of the chopper drums 44 and 46. As can be seen in particular in FIG. 7, because the mounting plate 132 is attached to the exterior of the side member 72a and the neck 134 extends through the drum bore 82, the bearing 126 may be mounted relatively closely to the interior of the side member 72a. Due to this close clearance between the bearing 126 and the side member 72a, even if the bearing mount 130 is mounted to the side member 72a (e.g., via the face plate 86a) at an orientation that causes the neck 134 to deviate from the desired axis of rotation 64 for the chopper drum 46, the effect of this deviation may be significantly reduced.

Other features may also be included. For example, referring again to FIG. 7, a shoulder 136 may be provided on the interior surface of each of the mounting plates 132, which may seat against the inner diameter of the associated drum bore 80 or 82 in order to further align the bearing mounts 130 with the appropriate axis of rotation 62 or 64 for the associated chopper drum 44 or 46.

On the opposite side of the chopper drum module 42, the gear box 108 may support the chopper drums 44 and 46 for rotation in various ways. As depicted in FIG. 7, for example, a stub shaft 138 supported by a bearing 140 may be bolted to the end of each of the chopper drums 44 and 46. The stub shafts 138 may be engaged in various known ways (e.g., via splined connections) with gears 142 and 144, which may be driven to rotate by input shaft 112 (not shown in FIG. 7) and, in certain embodiments, various intermediary gears.

Like the face plates 84a and 86a, the upper and lower face plates 84b and 86b on the side member 72b may also facilitate appropriate alignment of the axes of rotation 62 and 64 of the chopper drums 44 and 46. For example, similarly to the mounting plates 132 with respect to the face plates 84a and 86a, the cover 110 of the gear box 108 may be seated firmly against the face plates 84b and 86b when the gear box 108 is appropriately secured (e.g., bolted) to the side member 72b. Where the face plates 84b and 86b have been machined (or otherwise finished) to an appropriately flat surface that is normal to the desired parallel axes of rotation 62 and 64 for the chopper drums 44 and 46, this may assist in alignment of the stub shafts 138 (via the gear box 108) along the axes of rotation 62 and 64.

Figure 9:
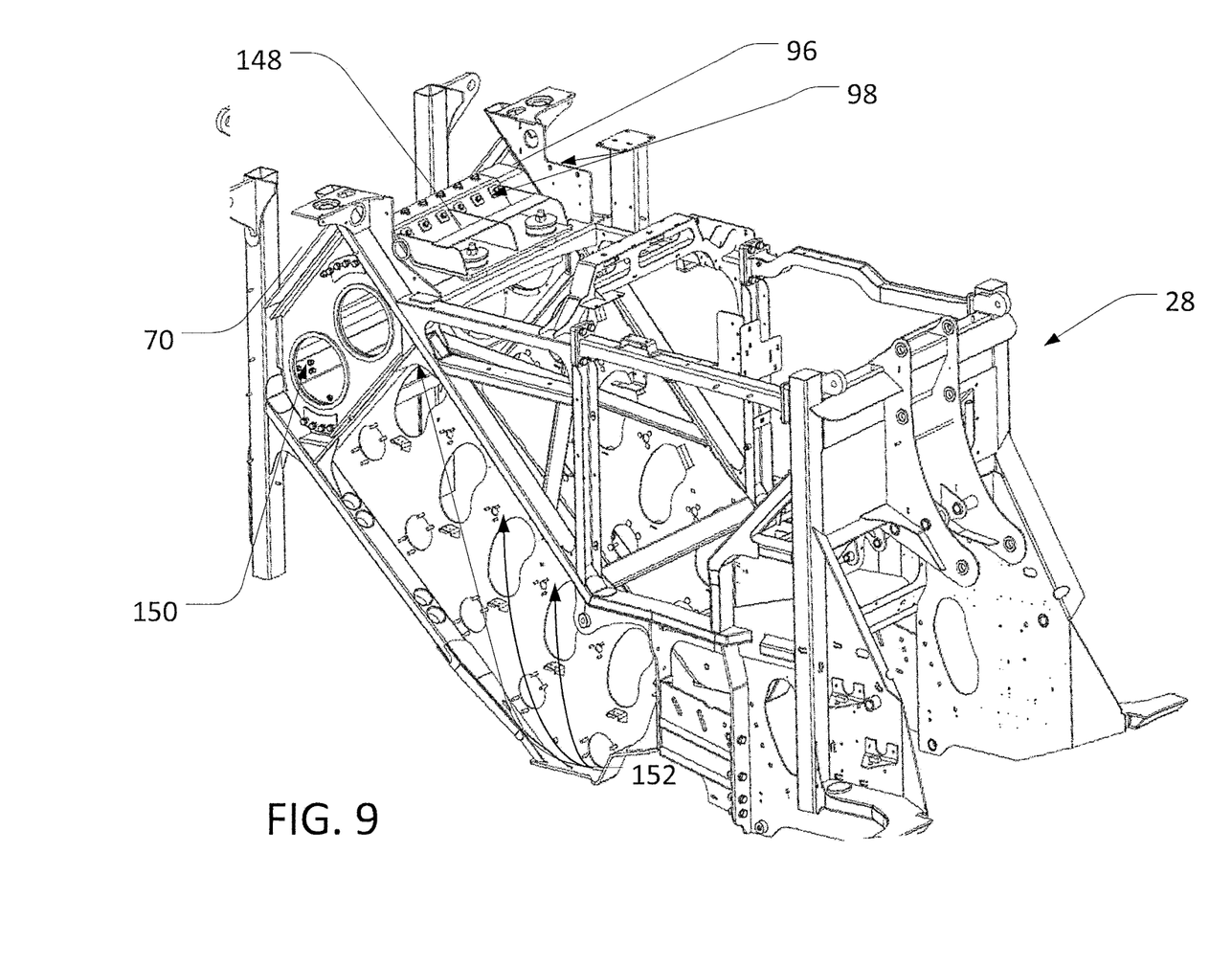
FIG. 9 is a perspective view of the chopper drum module of FIG. 4 mounted to a chassis of the harvester of FIG. 1.
Figure 10:
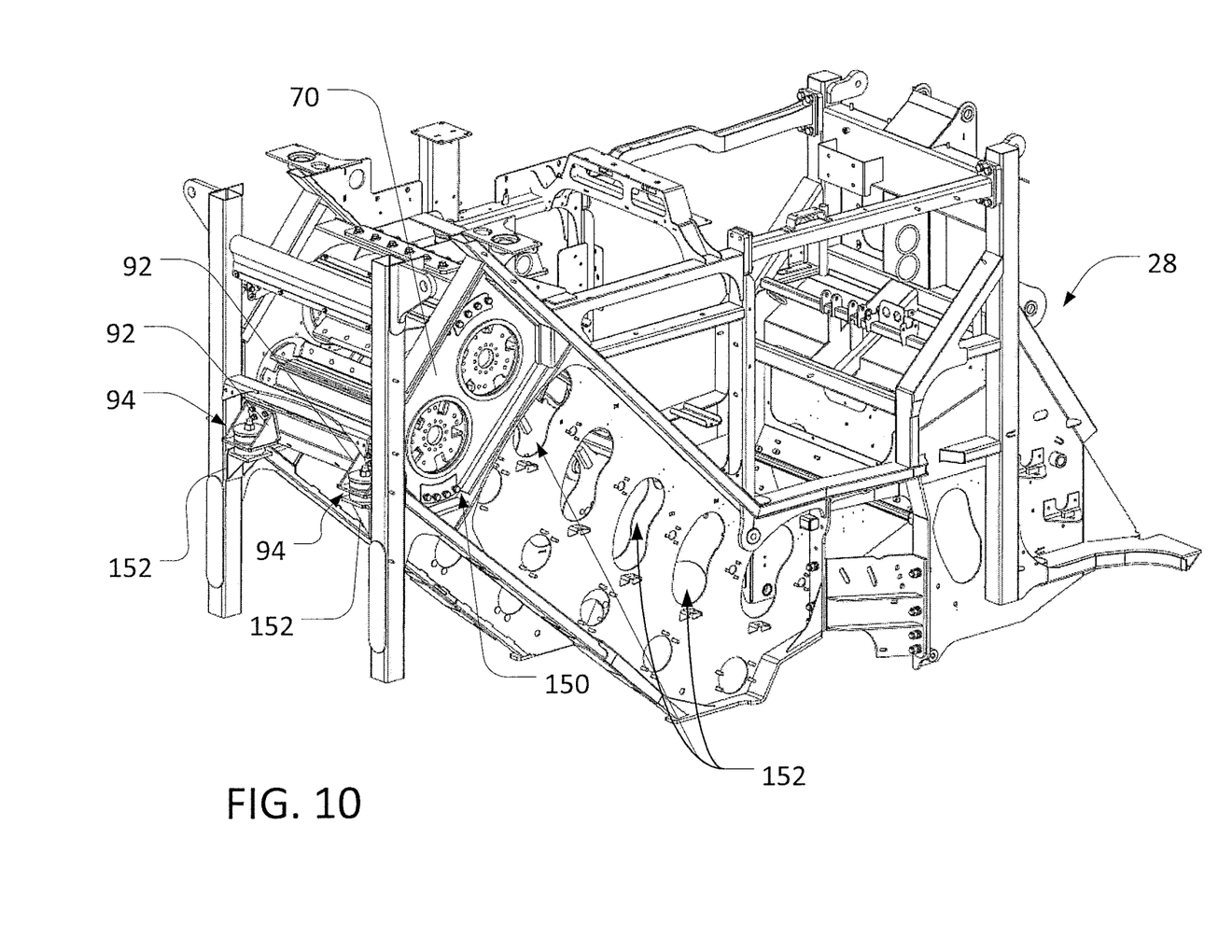
FIG. 10 is another perspective view of the chopper drum module of FIG. 4 mounted to a chassis of the harvester of FIG. 1.

As noted above, a fully assembled chopper drum module 42 (or various portions thereof) may be attached to the chassis 28 for operation. Referring also to FIGS. 9 and 10, for example, the chassis 28 may include side openings 150 generally above and behind mounting locations 152 for the various feed rollers 38 and 40. The chassis 28 may also include various mounting brackets 148 or other attachment members. In order to attach the chopper drum module 42 to the chassis, the module 42 (e.g., already fully assembled, including the gear box 108 and an associated hydraulic motor (not shown)) may be inserted through one of the side openings 150 and the various mounting brackets 92 and 96 (or other attachment members) of the module 42 appropriately aligned with the mounting brackets 148 (or other attachment member) of the chassis 28. Appropriate mounting devices (e.g., various isolators 94 and 98) may then be engaged to secure the module mounting brackets 92 and 96 to the chassis mounting brackets 148 and, thereby, to secure the module 42 to the chassis 28.

Figure 11:
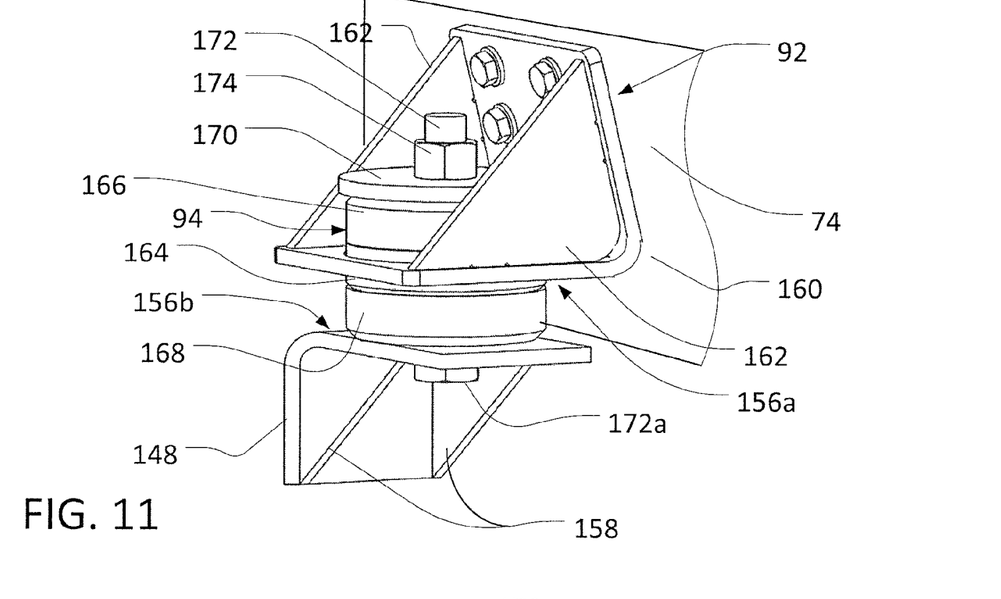
FIG. 11 is a perspective view of a mounting configuration for securing one of the mounting devices to the chassis of the harvester.
Figure 12:
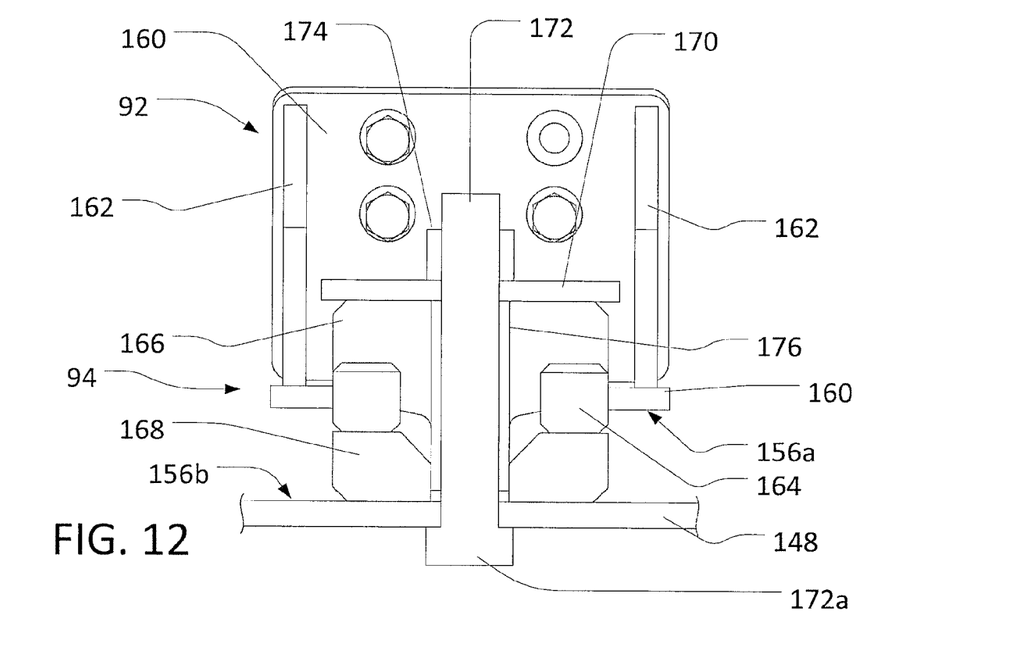
FIG. 12 is a sectional view of the mounting configuration of FIG. 11, taken through its centerline.

As also noted above, in certain embodiments, the mounting devices utilized to secure the module 42 to the chassis 28 may include vibration dampening devices, such as the isolators 94 and 98. Referring also to FIGS. 11 and 12, an example configuration of the isolator 94 and an associated chassis bracket 148 is depicted. It will be understood the isolator 98 may be configured similarly or differently to the isolator 94, and that various other types of vibration dampening devices may be possible.

In the embodiment depicted, the lower mounting bracket 92 includes a metal attachment member 160 that is bolted along one side of the member 160 to the cross member 74 of the module frame 70. The attachment member 160 also extends away from the cross member 74, as supported by two ribs 162, in order to interface with the chassis mounting bracket 148. The chassis bracket 148 may also include a bent metal member, supported by ribs 158, and may be attached to the chassis 28 in various known ways (e.g., by bolts or welds). The two brackets 92 may be configured such that they present relatively parallel mounting faces 156a and 156b to each other when the module 42 is appropriately aligned within the chassis 28. The mounting face 156a of the attachment member 160 may include a central passage, surrounded by a mounting ring 164 integrally formed with (or otherwise attached to) the attachment member 160, and the mounting face 156b of the bracket 148 may include a bolt hole or other opening.

The isolator 94 may be mounted to the attachment member 160 and may be engaged in order to generally secure the mounting bracket 92 to the mounting bracket 148 while also dampening the transmission of vibrations between the chassis 28 and the chopper module 42. In certain embodiments, the isolator 94 may include two isolator rings 166 and 168 (e.g., rubber rings) on opposite sides of the mounting ring 164. The lower isolator ring 168 may be seated between the mounting ring 164 and the lower mounting face 156b, and the upper isolator ring 166 may be seated between the mounting ring 164 and a moveable washer 170 (or other compression member). A metal (or other) sleeve 176 may extend through the rings 166 and 168 in order to resist shear forces on the isolator 94, and a bolt 172 (or other member) may extend through the sleeve 176, the hole in the mounting face 156b, and the washer 170. A head 172a of the bolt 172 may be seated on the chassis mounting bracket 148 opposite the mounting face 156b, and a nut 174 may be seated on the washer 170 opposite the isolator ring 166. In this way, by tightening the nut 174, an operator may compress the isolator rings 166 and 168 between the washer 170 and the bracket 148. This may urge the isolator rings 166 and 168 into the mounting ring 164 and thereby secure the module bracket 92 to the chassis bracket 148. With similar (or other) connections being established between various other mounts and devices on the chopper drum module 42 and the chassis 28 (e.g., between other brackets 92 and 94 on the module 42 and other brackets 148 on the chassis 28), the module 42 may thereby be secured to the chassis 28 for operation, and the transmission of vibrations between the chassis 28 and the module 42 may be appropriately dampened.

In the various figures, and in various examples above, the isolators 94 and 98 are depicted as being primarily mounted to the chopper drum module 42. It will be understood, however, that other configurations may be possible. For example, the isolators 94 and 98 (or various other vibration dampening devices), as well as various other types of mounting devices, may additionally (or alternatively) be mounted to the chassis 28 (or another feature of the harvester 20), such that the isolators 94 and 98 (or other devices) remain with the chassis 28 (or harvester 20) when the chopper drum module 42 is removed. Similarly, although various components (e.g., isolator rings 166 and 168, mounting ring 164, and so on) may be described as exhibiting a particular (e.g., annular) geometry, various other configurations may be possible. For example, in certain embodiments, square (or other) rubber gaskets (not shown) may be used in place of the isolator rings 166 and 168 in order to appropriately dampen vibrations. In certain embodiments, various materials other than rubber may alternatively (or additionally) be used. For example, polymer or other materials may be utilized to form various isolator rings or other devices. Similarly, various mechanical or other devices, such as springs, shock absorbers, dampeners, and so on may be utilized to dampen vibrations.

The terminology used herein is for the purpose of describing particular embodiments only and is not intended to be limiting of the disclosure. For example, the terms "upper," "lower," and the like may be used with respect to the relative orientation of a particular embodiment, but may not be intended to limit the disclosure to that orientation nor embodiment. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A chopper drum module for a sugarcane harvester with a chassis and a feed mechanism supported by the chassis, the chopper drum module comprising:
   first and second chopper drums;
   a module frame distinct from the chassis, the module frame including first and second side members attached by one or more cross members, each side member including first and second drum bores, the first drum bores being aligned with each other to support the first chopper drum for rotation around a first axis, and the second drum bores being aligned with each other to support the second chopper drum for rotation around a second axis substantially parallel to the first axis; and
   a plurality of mounting devices attached to one or more of the module frame and the chassis;
   wherein, when the plurality of mounting devices are in an engaged state, the module frame is secured to the chassis by the mounting devices, whereby the chopper drums are aligned to receive sugarcane from the feed mechanism; and
   wherein, when the plurality of mounting devices are in a disengaged state, the module frame and the chopper drums are collectively removable from the chassis and the sugarcane harvester.

2. The chopper drum module of claim 1, wherein at least one of the plurality of mounting devices includes a vibration dampening device to reduce transmission of vibration between the chassis and the module frame when the module frame is secured to the chassis.

3. The chopper drum module of claim 2, wherein the vibration dampening device include one or more rubber members interposed between the chassis and the module frame.

4. The chopper drum module of claim 3, wherein one of the chassis and the module frame includes a first attachment member;
   wherein an other of the chassis and the module frame includes a second attachment member;
   wherein the vibration dampening device further includes a compression member; and
   wherein, with the at least one of the plurality of mounting devices in the engaged state, the compression member and the first attachment member collectively urge the one or more rubber members against the second attachment member to secure the module frame to the chassis.

5. The chopper drum module of claim 1, further comprising:
   gear box for transmitting rotational power to the chopper drums, the gear box being mounted to the module frame;
   wherein, when the plurality of mounting devices are in the disengaged state, the gear box is collectively removable from the chassis and the sugarcane harvester with the module frame and the chopper drums.

6. The chopper drum module of claim 1, wherein each of the first and the second drum bores is surrounded, at least in part, on an exterior portion of the module frame, by a face plate, each face plate providing an alignment surface to align rotation of the first or the second chopper drum, respectively.

7. The chopper drum module of claim 1, further comprising:
   a bearing mount for each of the first and the second chopper drums, each bearing mount including a mounting plate attached to the module frame and a neck supporting a bearing for rotation of the first or the second chopper drum, respectively.

8. The chopper drum module of claim 7, wherein each mounting plate is attached to an exterior portion of the module frame, with each neck extending through the first or the second drum bore, respectively, into the interior of the module frame.

9. The chopper drum module of claim 8, wherein each neck supports the associated bearing within the interior of the first or the second chopper drum, respectively.

10. The chopper drum module of claim 7, wherein at least one mounting plate is seated on a face plate on an exterior portion of the module frame, the face plate extending away from one of the first and the second side members of the module frame.

11. A sugarcane harvester, comprising:
    a chassis;
    a feed mechanism supported by the chassis;
    first and second chopper drums;
    a module frame distinct from the chassis, the module frame including first and second side members attached by one or more cross members, each side member including first and second drum bores, the first drum bores being aligned with each other to support the first chopper drum for rotation around a first axis, and the second drum bores being aligned with each other to support the second chopper drum for rotation around a second axis substantially parallel to the first axis; and
    a plurality of mounting devices attached to one or more of the module frame and the chassis;
    wherein, when the plurality of mounting devices are in an engaged state, the module frame is secured to the chassis by the mounting devices, whereby the chopper drums are aligned to receive sugarcane from the feed mechanism; and
    wherein, when the plurality of mounting devices are in a disengaged state, the module frame and the chopper drums are collectively removable from the chassis and the sugarcane harvester.

12. The sugarcane harvester of claim 11, wherein at least one of the plurality of mounting devices includes a vibration dampening device to reduce transmission of vibration between the chassis and the module frame when the module frame is secured to the chassis.

13. The sugarcane harvester of claim 12, wherein the vibration dampening device include one or more rubber members interposed between the chassis and the module frame.

14. The sugarcane harvester of claim 13, wherein one of the chassis and the module frame includes a first attachment member;
   wherein an other of the chassis and the module frame includes a second attachment member;
   wherein the vibration dampening device further includes a compression member; and
   wherein, with the at least one of the plurality of mounting devices in the engaged state, the compression member and the first attachment member collectively urge the one or more rubber members against the second attachment member to secure the module frame to the chassis.

15. The sugarcane harvester of claim 11, further comprising:
   a gear box for transmitting rotational power to the chopper drums, the gear box being mounted to the module frame;
      wherein, when the plurality of mounting devices are in the disengaged state, the gear box is collectively removable from the chassis and the sugarcane harvester with the module frame and the chopper drums.

16. The sugarcane harvester of claim 11, wherein each of the first and the second drum bores is surrounded, at least in part, on an exterior portion of the module frame, by a face plate, each face plate providing an alignment surface to align rotation of the first or the second chopper drum, respectively.

17. The sugarcane harvester of claim 11, further comprising:
   a bearing mount for each of the first and the second chopper drums, each bearing mount including a mounting plate attached to the module frame and a neck supporting a bearing for rotation of the first or the second chopper drum, respectively.

18. The sugarcane harvester of claim 17, wherein each mounting plate is attached to an exterior portion of the module frame, with each neck extending through the first or the second drum bore, respectively, into the interior of the module frame.

19. The sugarcane harvester of claim 18, wherein each neck supports the associated bearing within the interior of the first or the second chopper drum, respectively.

20. The sugarcane harvester of claim 17, wherein at least one mounting plate is seated on a face plate on an exterior portion of the module frame, the face plate extending away from one of the first and the second side members of the module frame.

* * * * *